United States Patent Office 3,426,015
Patented Feb. 4, 1969

3,426,015
SUBSTITUTED 10,5-(IMINOMETHANO)-10,11-DI-HYDRO - 5H - DIBENZO[a,d]CYCLOHEPTEN-13-ONE DERIVATIVES
Thomas A. Dobson, St. Laurent, Quebec, and Martin A. Davis, Montreal, Quebec, Canada, assignors to American Home Products Corporation, New York, N.Y., a corporation of Delaware
No Drawing. Filed May 24, 1966, Ser. No. 552,387
U.S. Cl. 260—239.3                12 Claims
Int. Cl. C07d 41/04

ABSTRACT OF THE DISCLOSURE

This invention relates to chemical compounds of the formula:

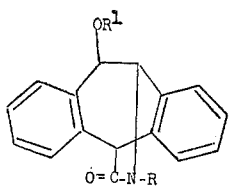

wherein R and $R^1$ represent hydrogen, lower alkyl, benzyl, betaphenethyl, N,N-diloweralkylamino or a heterocyclic substituted alkyl group and to means for their preparation. These compounds have a variety of useful pharmacological properties.

---

This invention relates to novel chemical compounds having useful biological properties, to a process for preparing them, and to intermediates used in their preparation. In particular, this invention relates to substituted 10,5 - (iminomethano) - 10,11-dihydro-5H-dizenzo[a,d]cyclohepten-13-one derivatives of the following Formula I

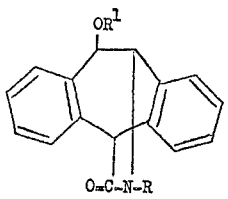

wherein R and $R^1$ are the same or different and represent hydrogen or a lower alkyl group such as, for example, the methyl, ethyl, propyl, isopropyl, n-butyl, or t-butyl group; an aralkyl group, such as, for example the benzyl or the β-phenethyl group; a substituted aminoalkyl group such as, for example, the diethylaminoethyl, dimethylaminoethyl, dimethylaminopropyl, or the diisopropylaminopropyl group; or a heterocyclic substituted alkyl group, such as, for example, the N-pyrrolidylethyl, N-piperidylethyl, N-(N'-methylpiperazino)ethyl, or the morpholinoethyl group. The pharmacologically acceptable salts of the basically substituted derivatives of Formula I are also included within the scope of this invention.

The compounds of Formula I wherein $R^1$ represents hydrogen and R is as defined above may be prepared by the following general scheme. Thus, 11-bromo-10,5-(epoxymethano) - 10,11-dihydro-5H-dibenzo[a,d]cyclohepten-13-one of Formula II and aqueous ammonia or an aqueous solution or suspension of a primary amine of formula $H_2NR$ wherein R is as defined above heated in an autoclave at a temperature within the range of 100° to 150° C. for a period of from four to ten hours to give, after cooling and filtering, one geometrical isomer of 11-hydroxy - 10,5 - (iminomethano)-10,11-dihydro-5H-dibenzo[a,d]cyclohepten-13-one of Formula I wherein $R^1$ represents hydrogen and R is as defined above.

Other geometrical isomers of the above compounds of Formula I may be prepared by the following general scheme. Thus, a solution of a compound of Formula I wherein $R^1$ represents hydrogen and R represents either hydrogen or a lower alkyl group or an aralkyl group in an inert solvent, preferably acetone, is treated at or below room temperature with an aqueous solution of chromic acid to yield, after reduction of excess chromic acid and removal of the solvent, 10,5-(iminomethano)-10,11-dihydro-5H-dibenzo[a,d]cyclohepten-11,13-dione of Formula III wherein R represents hydrogen or a lower alkyl group or an aralkyl group. The latter compounds in turn are dissolved in a suitable solvent, preferably ethanol, and hydrogenated at atmospheric pressure in the presence of a suitable noble metal catalyst such as, for example, a dispersion of palladium on charcoal, to yield, after removal of the catalyst and the solvent, the corresponding 11 - hydroxy - 10,5-(iminomethano)-10,11-dihydro-5H-dibenzo[a,d]cyclohepten-13-one of Formula I wherein R represents hydrogen or a lower alkyl group or an aralkyl group and $R^1$ represents hydrogen.

The two series of geometrical isomers obtained in this manner, and compounds derived therefrom, are arbitrarily designated as isomers A and B, respectively.

The compounds of Formula I wherein $R^1$ represents hydrogen and R is as defined above may be prepared by the following general method. Thus, a solution of 11-hydroxy - 10,5 - (iminomethano)-10,11-dihydro-5H-dibenzo[a,d]cyclohepten-13-one of Formula I wherein R and $R^1$ represent hydrogen in an inert solvent such as, for example, dioxan or benzene is first treated with one molar equivalent of a basic condensing agent, preferably sodium hydride, and then with one molar equivalent of a lower alkyl halide, an aralkyl halide, a substituted aminoalkyl halide, or a heterocyclic substituted alkyl halide, for a period of time of up to two days at a temperature within the range of 50° to 100° C. to yield, after removal of the solvent and crystallization, the corresponding 12-substituted - 11 - hydroxy-10,5-(iminomethano) - 10,11-dihydro-5H-dibenzo[a,d]cyclohepten-13-one of Formula I wherein $R^1$ represents hydrogen and R is as defined above.

The compounds of Formula I wherein R and $R^1$ are as defined above and may be the same or different may be prepared by the following general method. Thus, a solution of a 12-alkyl- or 12-aralkyl- or 12-(substituted aminoalkyl) or 12-heterocyclic substituted alkyl-11-hydroxy - 10,5-(iminomethano)-10,11-dihydro-5H-dibenzo[a,d]cyclohepten-13-one of Formula I, prepared as described above, in an inert solvent such as, for example, benzene or dioxan is first treated with one molar equivalent of a basic condensing agent such as, for example, sodium hydride and then with one molar equivalent of an alkyl halide, an aralkyl halide, a substituted aminoalkyl halide, or a heterocyclic substituted alkyl group, at a temperature within the range of 50° to 100° C. for a period of time of up to two days to yield, after removal of the solvent and extraction with a water-immiscible solvent, the corresponding compound of Formula I in which R and $R^1$ are as defined above and may be the same or different.

The basically substituted compounds of Formula I may optionally be converted to their pharmacologically acceptable acid addition salts with acids such as, for example, hydrochloric acid or oxalic acid.

The starting material for the compounds of this invention, namely 11-bromo-10,5-(epoxymethano)-10,11-dihydro-5H-dibenzo[a,d]cyclohepten-13-one may be prepared as described in our copending application S.N. 539,640, filed Apr. 4, 1966, now Patent No. 3,361,767. Briefly, this process entails the addition of one molar proportion of bromine to 5H-dibenzo[a,d]cycloheptene-5-carboxamide, which may be prepared as described by M. A. Davis et al. in J. Med. Chem. 7, 88 (1964), dissolved in an inert solvent such as, for example, chloroform, to produce 10,11-dibromo-10,11-dihydro-5H-dibenzo[a,d]cycloheptene-5-carboxamide, which upon treatment with either boiling water or a boiling alkanol yields the desired 11-bromo-10,5-(epoxymethano)-10,11-dihydro-5H-dibenzo[a,d]cyclohepten-13-one of Formula II.

The compounds of this invention inhibit the growth of *Trichomonas vaginalis* and are useful as trichomonicidal agents. As such, they may be formulated with suitable excipients in the form of vaginal suppositories or inserts containing from 50 to 250 mg. of the active ingredient, to be administered two to three times a day for periods of time of up to fourteen days.

The compounds of this invention of Formula I in which R and $R^1$ both represent hydrogen also possess marked activity upon the central nervous system, in particular anticonvulsant activity, especially against electro-shock to a very high degree, together with a low order of toxicity. The combination of the above properties makes the compounds useful as anti-convulsant agents. As such, they may be formulated into tablets or capsules with excipients such as lactose, starch, magnesium stearate, or magnesium silicate, each tablet or capsule containing from 75 to 500 mg. of the active ingredient. Such tablets or capsules may be administered from one to four times per day for prolonged periods of time.

Some of the compounds of this invention, in particular the compounds of Formula I in which R represents a dialkylaminoalkyl group and $R^1$ represents hydrogen, also possess local anaesthetic activity and are useful as local anaesthetic agents. As such, they may be formulated in solutions or suspensions with pharmaceutically acceptable carriers, containing from 0.1 to 2 percent of the active ingredient, and may be applied locally as required.

The following formulae and examples, in which R and $R^1$ are as defined above, will be illustrative of this invention.

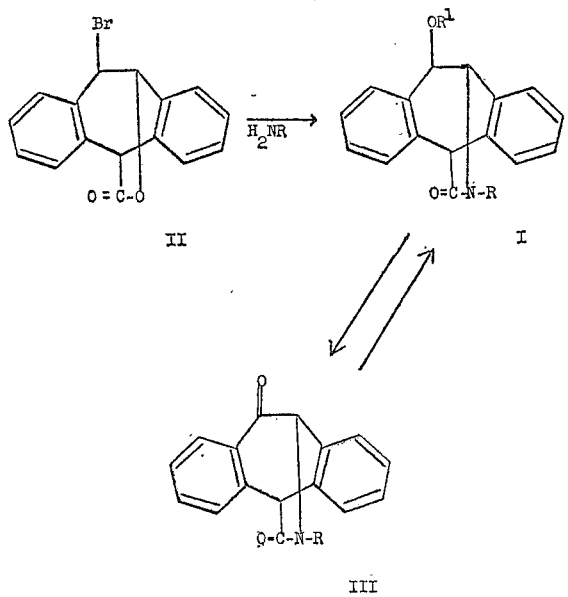

Example 1.—11-hydroxy-10,5-(iminomethano)-10,11-dihydro-5H-dibenzo[a,d]cyclohepten-13-one (isomer A)

11 - bromo - 10,5-(epoxymethano)-10,11-dihydro-5H-dibenzo[a,d]cyclohepten-13-one of Formula II (30 g.) and aqueous ammonium hydroxide solution (250 ml.; d. 0.9) are heated together at 120° for 4.5 hours in a rocking autoclave.

The solid product is collected and crystallized from ethanol to give the title product with M.P. 260–262° C.

Example 2.—11-hydroxy-10,5-(iminomethano)-10,11-dihydro-5H-dibenzo[a,d]cyclohepten-13-one (isomer B)

A solution of 10,5-(iminomethano)-10,11-dihydro-5H-dibenzo[a,d]cyclohepten - 11,13 - dione prepared as described in Example 5 (500 mg.) in dry methanol (50 ml.) is hydrogenated at atmospheric pressure in the presence of 10% palladium-charcoal catalyst (100 mg.) until one molar proportion of hydrogen is absorbed. The catalyst is separated and the filtrate is evaporated. The residue is purified from methanol to give the title product of M.P. 260–263° C.

Example 3.—11 - hydroxy - 12-methyl-10,5-(iminomethano) - 10,11 - dihydro-5H-dibenzo[a,d]cyclohepten-13-one (isomer A)

A mixture of 11-bromo-10,5-(epoxymethano)-10,11-dihydro-5H-dibenzo[a,d]cyclohepten-13-one of Formula II (275 g.) and methylamine (700 ml. of a 25% aqueous solution) is heated at 120° C. in a stirred autoclave for 6 hours. The solid product is collected, thoroughly washed with water and then purified from methanol to give the title product of M.P. 267°–270° C.

In the same manner, but using ethylamine, propylamine, isopropylamine, n - butylamine, t - butylamine, benzylamine, β-phenethylamine, diethylaminoethylamine, dimethylaminoethylamine, dimethylaminopropylamine, diisopropylaminopropylamine, N-pyrrolidylethylamine, N-piperidylethylamine, N-(N'-methylpiperazino)ethylamine, or N - morpholinoethylamine, respectively, instead of methylamine, the isomers A of the following 12-substituted - 11 - hydroxy - 10,5 - (iminomethano) - 10,11-dihydro - 5H - dibenzo[a,d]cyclohepten - 13 - ones are respectively obtained: 12 - ethyl - (Ia), 12 - propyl - (Ib), 12 - isopropyl - (Ic), 12 - n - butyl - (Id), 12-t-butyl-(Ie), 12-benzyl-(If), 12-β-phenethyl-(Ig), 12-diethylaminoethyl-(Ih), 12 - dimethylaminoethyl - (Ii), 12 - dimethylaminopropyl-(Ij), 12-diisopropylaminopropyl-(Ik), 12-N-pyrrolidylethyl - (Il), 12 - N-piperidylethyl-(Im), 12-N-(N'-methylpiperazino)ethyl-(In) and 12-N-morpholinoethyl-11 - hydroxy - 10,5 - (iminomethano)-10,11-dihydro-5H-dibenzo[a,d]cyclohepten-13-one (Io).

Alternatively, a stirred suspension of 11-hydroxy-10,5-(iminomethano) - 10,11 - dihydro-5H-dibenzo[a,d]cyclohepten-13-one (isomer A) prepared as described in Example 1 (2.51 g.) in dry dioxan (50 ml.) is treated with sodium hydride suspension (450 mg. of a 54% suspension). The mixture is refluxed for one half-hour, cooled to 50° C. and methyl iodide (1.42 g.) is added. The mixture is refluxed overnight. The solvent is removed in vacuo and the residue is triturated with hot water. The water insoluble product is dried and crystallized from methanol to give the title compound identical with the product obtained above.

In the same manner, but using ethyl iodide, propyl iodide, isopropyl iodide, n-butyl iodide, t-butyl iodide, benzyl chloride, or β-phenethyl bromide respectively, the 12-ethyl, 12-propyl, 12-isopropyl, 12-n-butyl, 12-t-butyl, 12-benzyl, or 12-β-phenethyl derivatives described above (Ia to Ig) are respectively obtained.

Example 4.—11-hydroxy-12-methyl-10,5-(iminomethano) 10,11 - dihydro - 5H - dibenzo[a,d]cyclopenten-13-one (isomer B)

A solution of 12-methyl-10,5-(iminomethano)-10,11-dihydro-5H-dibenzo[a,d]cyclohepten-11,13-dione (III) prepared as described in Example 6 (6.0 g.) in ethanol (400 ml.) containing 10% palladium-charcoal catalyst (100 mg.) is shaken under hydrogen until uptake ceases. The catalyst is removed and the filtrate is evaporated to dryness. The residue is crystallized from isopropanol to give the title compound with M.P. 216–220° C.

In the same manner, but using the compounds (IIIa) to (IIIg) respectively, obtained in Example 6, as starting materials, the isomers B of the compounds (Ia) to (Ig) respectively, described in Example 3, are obtained.

Example 5.—10,5-(iminomethano)-10,11-dihydro-5H-dibenzo[a,d]-cycloheptene-11,13-dione Chromic acid (8 N, 1.0 ml.) is added dropwise to a stirred, ice cold suspension of 11-hydroxy-10,5-(iminomethano)-10,11-dihydro-5H-dibenzo[a,d]cyclohepten-13-one, prepared as described in Example 1 (500 mg.) in acetone (30 ml.). The mixture is stirred for a further 20 minutes, evaporated to small volume and the residue is partitioned between chloroform and water. Evaporation of the chloroform phase and crystallization of the residue from chloroform-benzene yields the title compound with M.P. 197°–199° C.

Example 6.—12-methyl-10,5-(iminomethano)-10,11-dihydro-5H-dibenzo-[a,d]cycloheptene-11,13-dione To a stirred, ice-cold suspension of 11-hydroxy-12-methyl - 10,5-(iminomethano)-10,11-dihydro-5H-dibenzo[a,d]-cycloheptene-13-one prepared as described in Example 3 (17.0 g.), in acetone (200 ml.) is added 8 N chromic acid solution (34 ml.) dropwise during 20 minutes. When the addition is complete, the mixture is stirred for a further 20 minutes and a small amount of ethanol is added to the mixture to destroy the excess chromic acid. The solution is concentrated to small volume at low temperature and the residue is triturated with water. The water insoluble residue is crystallized from methanol to yield the title compound with M.P. 153°–155° C.

In the same manner, but using the compounds (Ia) to (Ig) inclusive respectively, as starting materials instead of 11-hydroxy-12-methyl-10,5-(iminomethano)-10,11-dihydro-5H-dibenzo[a,d]cyclohepten-13-one, the following 12-substituted 10,5-(iminomethano)-10,11-dihydro-5H-dibenzo[a,d]cycloheptene-11,13-diones are respectively obtained: 12-ethyl-(IIIa), 12-propyl-(IIIb), 12-isopropyl-(IIIc), 12-n-butyl-(IIId), 12-t-butyl-(IIIe), 12-benzyl-(IIIf) and 12-(β-phenethyl)-10,5-(iminomethano)-10,11-dihydro - 5H - dibenzo[a,d] - cycloheptene-11,13-dione-(IIIg).

Example 7.—11-hydroxy-12-(β-N,N-diethylaminoethyl)-10,5 - (iminomethano)-10,11-dihydro-5H-dibenzo[a,d] cyclohepten-13-one A mixture of 11-hydroxy-10,5-(iminomethano)-10,11-dihydro-5H-dibenzo[a,d]cyclohepten-13-one, prepared as described in Example 1 (5.02 g.), dry dioxan (100 ml.) and sodium hydride (920 mg. of a 54% suspension) is gently refluxed for 30 minutes. To the mixture, diethylaminoethyl chloride (3.4 g.) is added during 5 minutes. The mixture is refluxed for 3 hours, diluted with water and evaporated to a small volume. The solid product is collected and crystallized from benzene-hexane to yield the title compound with M.P. 166°–168° C.

The hydrochloride salt is obtained by treating the above compound with hydrogen chloride in methanol. It is crystallized from isopropanol-ether to M.P. 135–140° C.

In the same manner, but using dimethylaminoethyl chloride, dimethylaminopropyl chloride, diisopropylaminopropyl chloride, N-pyrrolidylethyl chloride, N-piperidylethyl chloride, N-(N'-methylpiperazino)ethyl chloride, or N-morpholinoethyl chloride, respectively, as starting material instead of diethylaminoethyl chloride, the compounds (Ii) to (Io) inclusive, respectively, described in Example 3, are obtained.

Example 8. — 11 - diethylaminoethoxy - 12 - methyl-10,5 - (iminomethano) - 10,11 - dihydro - 5H - dibenzo[a,d]cyclohepten-13-one To a solution of 11-hydroxy-12-methyl-10,5-(iminomethano) - 10,11 - dihydro - 5H - dibenzo[a,d]cyclohepten-13-one, prepared as described in Example 3 (8.12 g.), in dry dioxan (100 ml.) sodium hydride (1.48 g. of a 54% suspension) is added. The mixture is refluxed and stirred for 1 hour, cooled and diethylaminoethyl chloride (6.0 g.) is added during 5 minutes. The mixture is then stirred and refluxed overnight. The solvent is removed in vacuo and the residue is partitioned between water and ethyl acetate. The ethyl acetate phase is extracted with 10% hydrochloric acid and the acid extracts are made alkaline and extracted with ethyl acetate. The combined extracts are water washed, dried and evaporated to yield the title compound as an oil characterized by infrared absorption bands at 1650 cm.$^{-1}$ and 2820 cm.$^{-1}$, which is converted to the crude oxalate which is then purified from isopropanol to give the oxalate salt with M.P. 188°–192° C.

In the same manner but using as starting materials the compounds (Ia) to (Io) inclusive respectively, described in Example 3, and using methyl iodide, ethyl iodide, propyl iodide, isopropyl iodide, n-butyl iodide, t-butyl iodide, benzyl chloride, β-phenethyl bromide, dimethylaminoethyl chloride, dimethylaminopropyl chloride, diisopropylaminopropyl chloride, N-pyrrolidylethyl chloride, N-piperidylethyl chloride, N-(N'-methylpiperazino) ethyl chloride, or N-morpholinoethyl chloride, respectively, 11-methoxy-, 11-ethoxy-, 11-propoxy-, 11-isopropyloxy-, 11-n-butoxy-, 11-t-butoxy-, 11-benzyloxy-, 11-(β-phenethyloxy)-, 11-dimethylaminoethoxy-, 11-dimethylaminopropoxy-, 11-diisopropylaminopropoxy-, 11-N-pyrrolidylethoxy-, 11-N-piperidylethoxy, 11-N-(N'-methylpiperazine)ethoxy, and N-morpholinoethoxy derivatives of the compounds (Ia) to (In) inclusive are respectively obtained.

We claim:

1. A compound selected from the group which consists of compounds of the formula

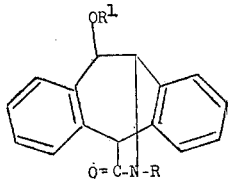

wherein R and R$^1$ are the same or different substituents and are selected from the group which consists of hydrogen, lower alkyl containing from one to four carbon atoms, benzyl, β-phenethyl, dimethylaminoethyl, diethylaminoethyl, dimethylaminopropyl, diisopropylaminopropyl, N-pyrrolidylethyl, N-piperidylethyl, N-(N'-methylpiperazino)ethyl, and morpholinoethyl; and acid addition salts of said compounds with pharmacologically acceptable acids.

2. 11 - hydroxy - 10,5 - (iminomethano) - 10,11 - dihydro-5H-dibenzo[a,d]cyclohepten-13-one, as claimed in claim 1.

3. 11 - hydroxy - 12 - methyl - 10,5 - (iminomethano)-10,11 - dihydro - 5H - dibenzo[a,d]cyclohepten - 13 - one, as claimed in claim 1.

4. 10,5 - (iminomethano) - 10,11 - dihydro - 5H - dibenzo[a,d]cycloheptene - 11,13 - dione, as claimed in claim 1.

5. 12 - methyl - 10,5 - (iminomethano) - 10,11 - dihydro - 5H - dibenzo[a,d]cycloheptene - 11,13 - dione, as claimed in claim 1.

6. 11 - hydroxy - 12 - (β - N,N - diethylaminoethyl)-10,5 - (iminomethano) - 10,11 - dihydro - 5H - dibenzo[a,d]cyclohepten-13-one, as claimed in claim 1.

7. The hydrochloride salt of 11-hydroxy-12-(β-N,N-diethylaminoethyl) - 10,5 - (iminomethano) - 10,11 - dihydro-5H-dibenzo[a,d]cyclohepten-13-one, as claimed in claim 1.

8. 11-diethylaminoethoxy - 12 - methyl - 10,5 - (iminomethano) - 10,11 - dihydro - 5H - dibenzo[a,d]cyclohepten-13-one, as claimed in claim 1.

9. The oxalate salt of 11-diethylaminoethoxy-12-methyl-10,5-(iminomethano)-10,11-dihydro-5H-dibenzo[a,d]cyclohepten-13-one, as claimed in claim 1.

10. The process of preparing a lactam of the formula

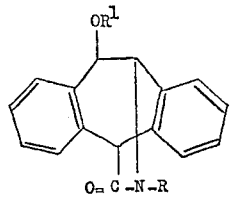

wherein R and R¹ are the same or different substituents and are selected from the group which consists of hydrogen, lower alkyl containing from one to four carbon atoms, benzyl, β-phenethyl, dimethylaminoethyl, diethylaminoethyl, dimethylaminopropyl, diisopropylaminopropyl, N-pyrrolidylethyl, N-piperidylethyl, N-(N'-methylpiperazino)ethyl, and morpholinoethyl; which comprises treating a bromolactone of the formula

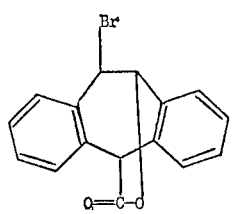

II with a reagent selected from the group which consists of aqueous ammonia, and aqueous solutions and aqueous suspensions of a primary amine of formula H₂NR, R being as above defined; said reaction being carried out by heating said reaction mixture in a closed vessel at a temperature in excess of about 100° C., to obtain a compound of Formula I in which R has the significance defined above and in which R¹ represents hydrogen; and treating said last named compound with an organic halide selected from the group consisting of alkyl halides containing from one to four carbon atoms, benzyl halides, β-phenethyl halides, dimethylaminoethyl halides, diethylaminoethyl halides, dimethylaminopropyl halides, diisopropylaminopropyl halides, N-pyrrolidylethyl halides, N-piperidylethyl halides, N-(N'-methylpiperazino)ethyl halides, and morpholinoethyl halides in the presence of an alkali metal hydride, to obtain a compound of Formula I in which R and R¹ are as above defined.

11. The process of preparing an 11-ketolactam of the formula

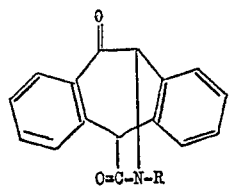

III wherein R is selected from the group which consists of hydrogen, lower alkyl containing from one to four carbon atoms, benzyl, and β-phenethyl, which comprises oxidizing an 11-hydroxylactam of the formula

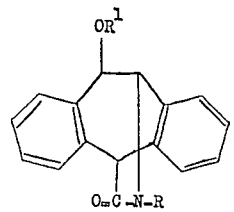

I wherein R¹ represents hydrogen, and R is as above defined, said oxidation being carried out by treating said 11-hydroxylactam with an aqueous solution containing chromic acid as oxidizing agent.

12. The process of preparing a compound of the formula

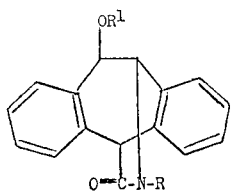

I wherein R and R¹ are the same or different substituents and are selected from the group which consists of hydrogen, lower alkyl containing from one to four carbon atoms, benzyl, β-phenethyl, dimethylaminoethyl, diethylaminoethyl, dimethylaminopropyl, diisopropylaminopropyl, N-pyrrolidylethyl, N-piperidylethyl, N-(N'-methylpiperazino)ethyl, and morpholinoethyl; which comprises reducing a compound of the formula

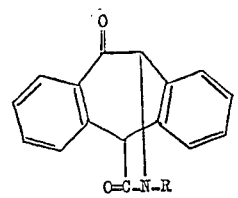

III

R having the above-defined significance and where R¹ is other than hydrogen, by subsequent treatment of the reduction product alcohol with the appropriate halide in the presence of a strong base.

References Cited

UNITED STATES PATENTS 3,075,967   1/1963   Krapcho _____ 260—239.3

HENRY R. JILES, *Primary Examiner.*

ROBERT T. BOND, *Assistant Examiner.*

U.S. Cl. X.R.

424—261, 250, 248